(12) United States Patent  
Carlson et al.

(10) Patent No.: US 12,160,098 B2  
(45) Date of Patent: Dec. 3, 2024

(54) HYBRID CIRCUIT BREAKER WITH SOLID-STATE DEVICES

(71) Applicant: ROCKWELL AUTOMATION TECHNOLOGIES, INC., Mayfield Heights, OH (US)

(72) Inventors: Andrew E. Carlson, Franklin, WI (US); Kyle B. Adkins, Oak Creek, WI (US); Randall S. Langer, Oak Creek, WI (US); David Elmiger, Hitzkirch (CH); Aiman Kerim, Aarau (CH); James P. Miller, Waterford, WI (US)

(73) Assignee: Rockwell Automation Technologies, Inc., Mayfield heights, OH (US)

( * ) Notice: Subject to any disclaimer, the term of this patent is extended or adjusted under 35 U.S.C. 154(b) by 120 days.

(21) Appl. No.: 17/889,199

(22) Filed: Aug. 16, 2022

(65) Prior Publication Data

US 2024/0063629 A1    Feb. 22, 2024

(51) Int. Cl.
*H02H 3/20*         (2006.01)
*H01H 1/20*         (2006.01)
*H01H 9/54*         (2006.01)

(52) U.S. Cl.
CPC ............... *H02H 3/20* (2013.01); *H01H 1/20* (2013.01); *H01H 9/542* (2013.01)

(58) Field of Classification Search
CPC .... H01H 71/10; H01H 71/12; H01H 71/1081; H01H 9/30; H02H 3/20; H02H 3/08; H02H 9/02; H02H 1/0007; H02H 1/0023
USPC ...................................................... 361/2–13
See application file for complete search history.

(56) References Cited

U.S. PATENT DOCUMENTS

| | | | | |
|---|---|---|---|---|
| 2010/0006544 | A1* | 1/2010 | Onufriyenko | H01H 73/045 218/154 |
| 2010/0007997 | A1* | 1/2010 | Kao | H01H 9/542 361/13 |
| 2013/0027829 | A1* | 1/2013 | Antoniazzi | H02H 7/28 361/100 |

(Continued)

FOREIGN PATENT DOCUMENTS

EP         3550582 A1    10/2019

OTHER PUBLICATIONS

EP Search Report for EP Application No. 23183792.3, Mailed Jan. 2, 2024, 9 Pages.

*Primary Examiner* — Danny Nguyen
(74) *Attorney, Agent, or Firm* — Fletcher Yoder, P.C.

(57) ABSTRACT

This disclosure describes a hybrid circuit breaker for an industrial automation system including a mechanical switch and solid-state switching circuit. The hybrid circuit breaker may receive control signals to open and close a current path based on moving a spanner of the mechanical switch. In some cases, moving the spanner of the mechanical switch may generate electrical arcs when the hybrid circuit breaker is conducting electrical current. In such cases, the hybrid circuit breaker may remove the electrical arcs based on operations of the solid-state switching circuit. The solid-state switching circuit may draw arc currents of the electrical arcs by providing a second current path between the spanner and a fixed conductor of the mechanical switch. Moreover, the solid-state switching circuit may open the second current path and absorb electrical power of the electrical arc by one or more solid-state switches, a parallel voltage suppressor, or both.

17 Claims, 5 Drawing Sheets

(56) References Cited

U.S. PATENT DOCUMENTS

| | | | |
|---|---|---|---|
| 2013/0199912 A1 | 8/2013 | Azzola et al. | |
| 2014/0175060 A1 | 6/2014 | Reymond et al. | |
| 2015/0280421 A1* | 10/2015 | Niwa | H01H 33/596 |
| | | | 361/91.1 |
| 2018/0122612 A1* | 5/2018 | Koepf | H01H 33/596 |
| 2020/0212670 A1* | 7/2020 | Butler | H01H 9/542 |
| 2020/0321180 A1* | 10/2020 | Zhou | H01H 9/542 |
| 2022/0115859 A1* | 4/2022 | Zhou | H02H 1/0023 |
| 2023/0197390 A1* | 6/2023 | Engewald | H01H 73/045 |
| | | | 335/16 |

* cited by examiner

HYBRID CIRCUIT BREAKER WITH SOLID-STATE DEVICES

BACKGROUND

This disclosure relates generally to systems and methods for circuit breakers used within industrial automation systems. More specifically, the present disclosure discusses mechanical and solid-state circuit breakers, which may be used to protect a portion of an industrial automation system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An industrial automation system may include a variety of components associated with different types of motors and motor-drive configurations. For example, different motor-drive configurations may use different types of protection and electrical isolation systems to protect various electrical components connected to a motor-drive system from certain overvoltage and/or overcurrent situations. To effectively protect and operate a variety of types of motors and electrical systems in an industrial automation system, circuit breakers may be included between an electrical load (e.g., a motor) and a power supply.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a circuit breaker is described. The circuit breaker may include a first conductor that may move between a first position and a second position. The first position may correspond to a second conductor of the circuit breaker being coupled to a third conductor via the first conductor. Moreover, the second position may correspond to the second conductor being uncoupled from the third conductor via the first conductor. The circuit breaker may also include voltage suppression circuitry coupled to the first conductor and the second conductor. The voltage suppression circuitry may receive an arc current as the first conductor moves from the first position to the second position. Moreover, the voltage suppression circuitry may suppress the arc current when receiving the arc current.

In another embodiment, a method is described. The method may include receiving an indication to open a first conductive path of a circuit breaker by a processor. The first conductive path may include a first conductor, a second conductor, and a spanner. The method may include transmitting a first signal to an actuator to move the spanner from a first position to a second position by the processor. The first conductive path may open after the spanner is located in the second position. Moreover, the method may include transmitting, by the processor, one or more second signals to one or more solid-state switches coupled to a second conductive path of the circuit breaker in response to receiving an indication of current flow present on the second conductive path. The second conductive path may include the first conductor, the one or more solid-state switches, and the spanner.

In another embodiment, a tangible, non-transitory, machine-readable medium, including machine-readable instructions that, when executed by a processor, cause the processor to perform actions is described. The actions may include receiving an indication to open a first conductive path of a circuit breaker by a processor. The first conductive path may include a first conductor, a second conductor, and a spanner. The actions may include transmitting a first signal to an actuator to move the spanner from a first position to a second position. The first conductive path may open after the spanner is located in the second position. The actions may also include transmitting one or more second signals to one or more solid-state switches coupled to a second conductive path of the circuit breaker in response to receiving an indication of current flow present on the second conductive path. The second conductive path may include the first conductor, the one or more solid-state switches, and the spanner.

DRAWINGS

These and other features, aspects, and advantages of the present disclosure will become better understood when the following detailed description is read with reference to the accompanying drawings in which like characters represent like parts throughout the drawings, wherein.

Figure 1:
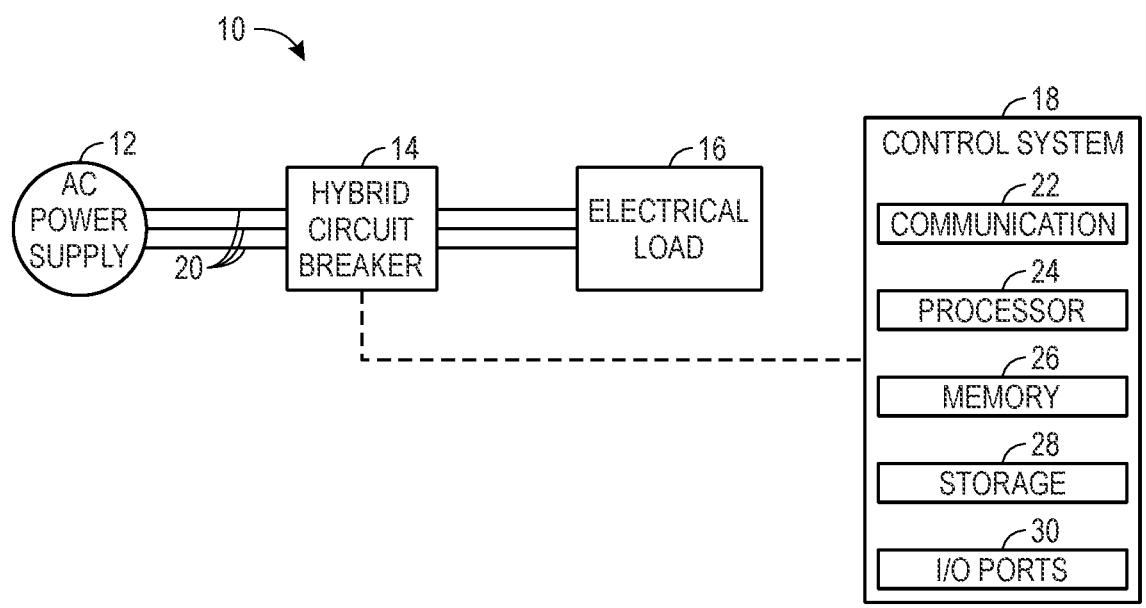
FIG. 1 is a block diagram of a feeder system including a hybrid circuit breaker that may be part of an industrial automation system, in accordance with embodiments described herein.
Figure 2:
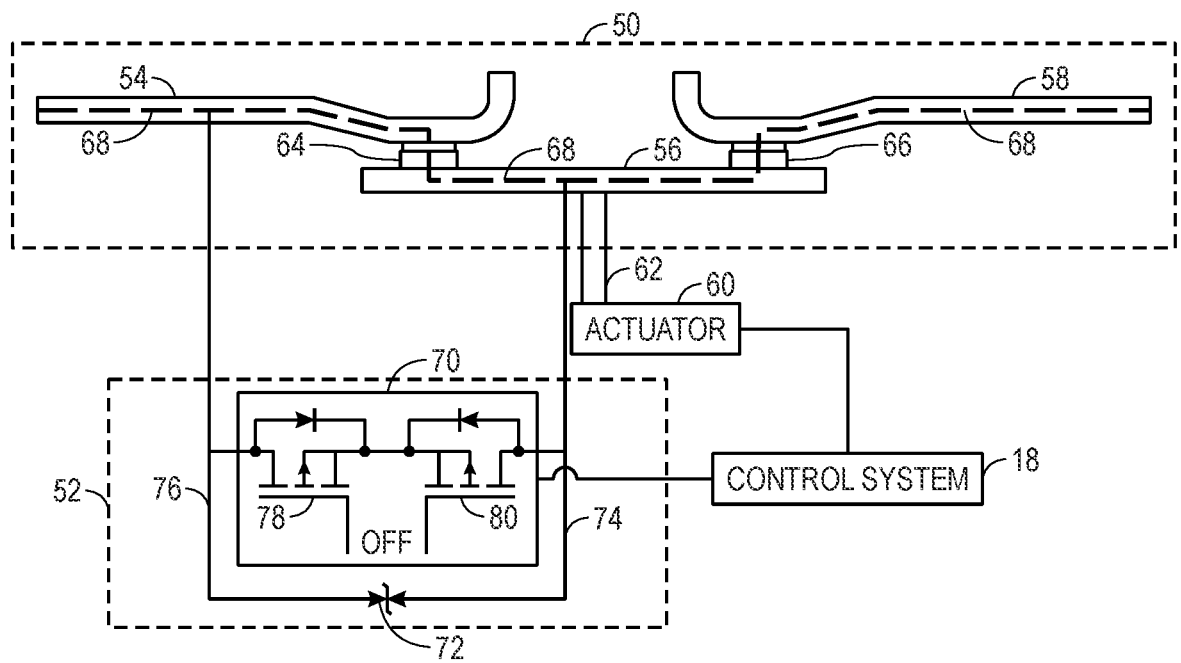
FIG. 2 is a an embodiment of the hybrid circuit breaker of the feeder system of FIG. 1 when a mechanical switch system is conducting electrical current through a first current path, in accordance with embodiments described herein.
Figure 3:
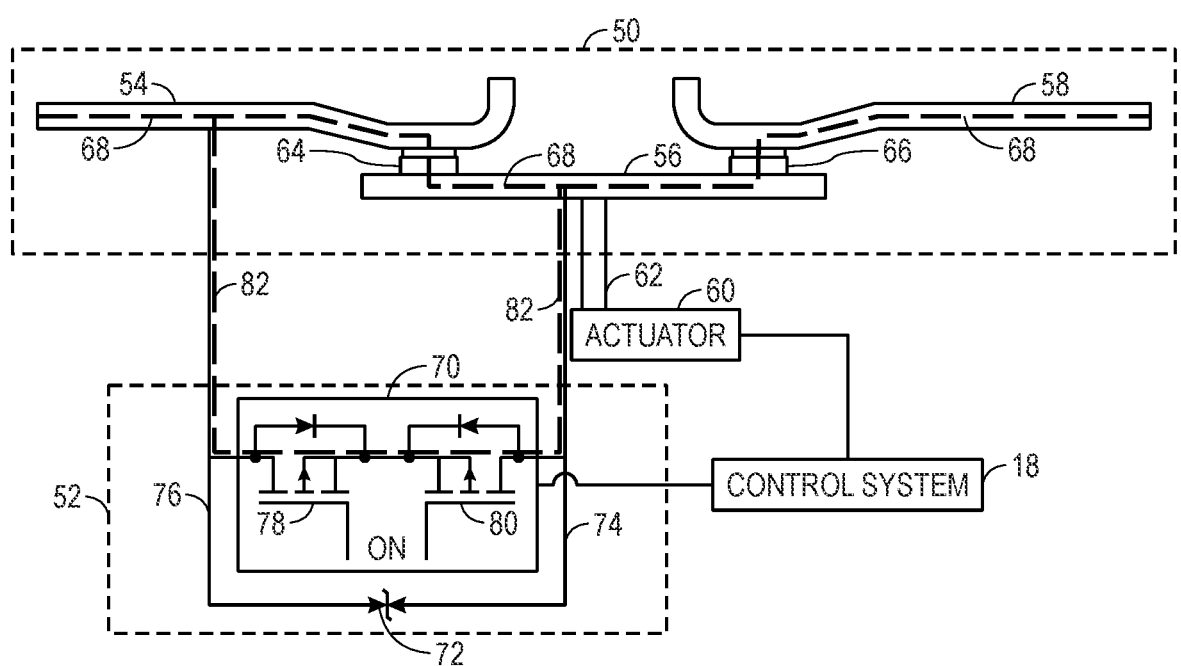
Figure 4:
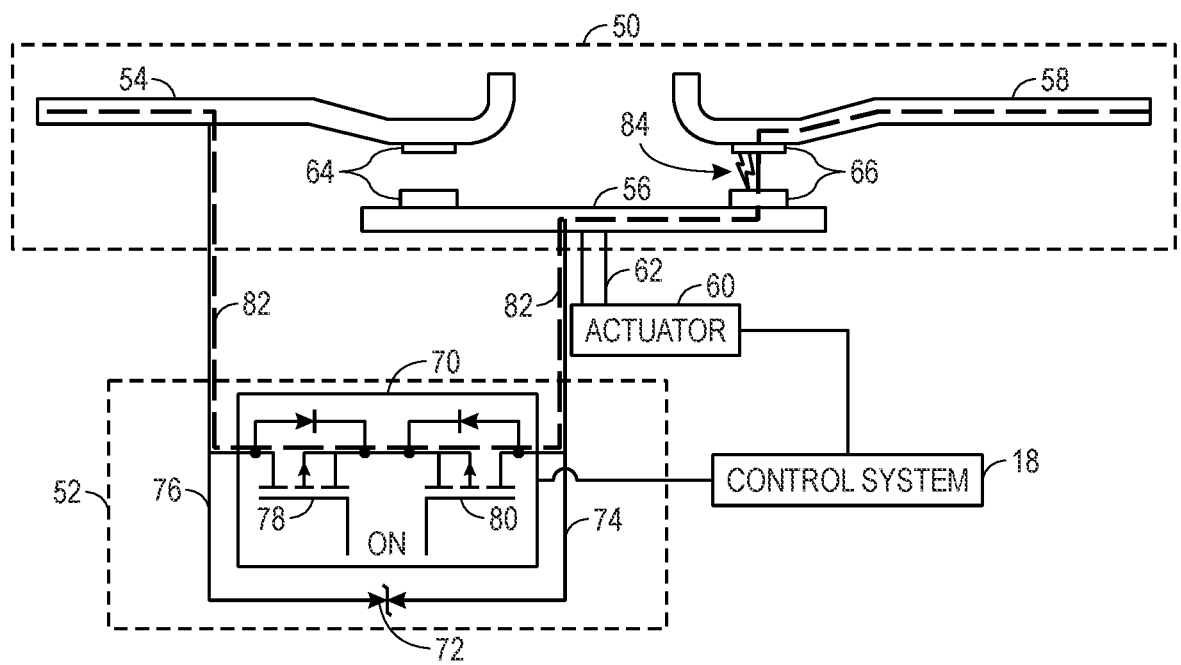
Figure 5:
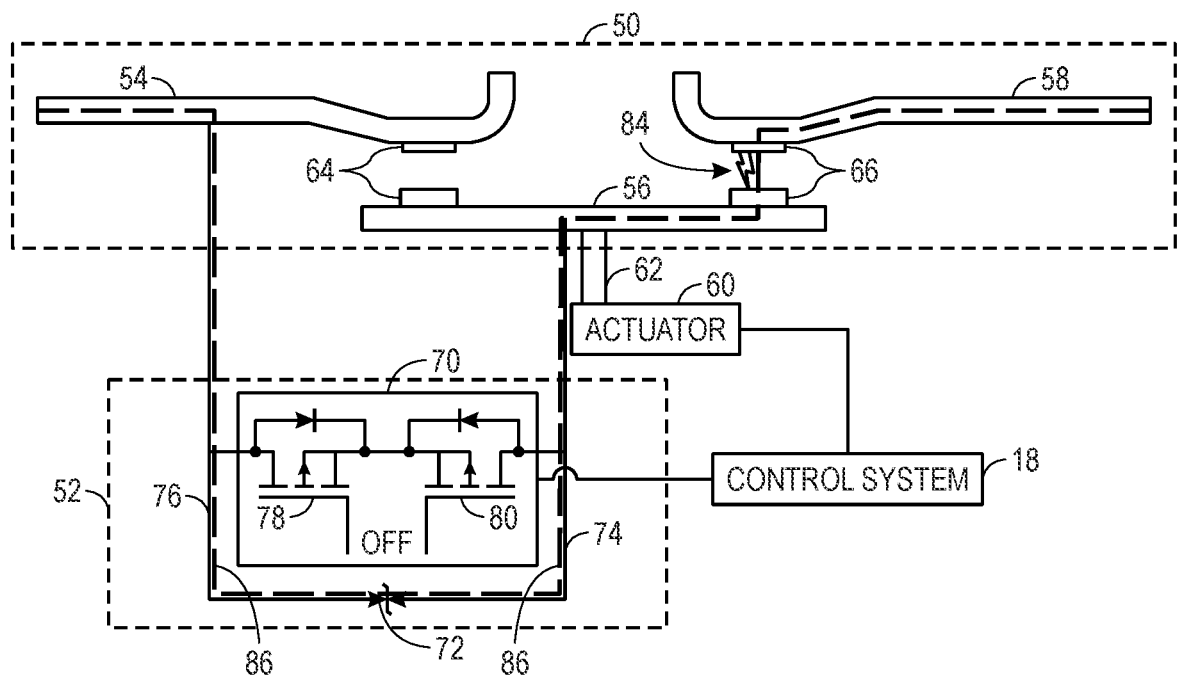
Figure 6:
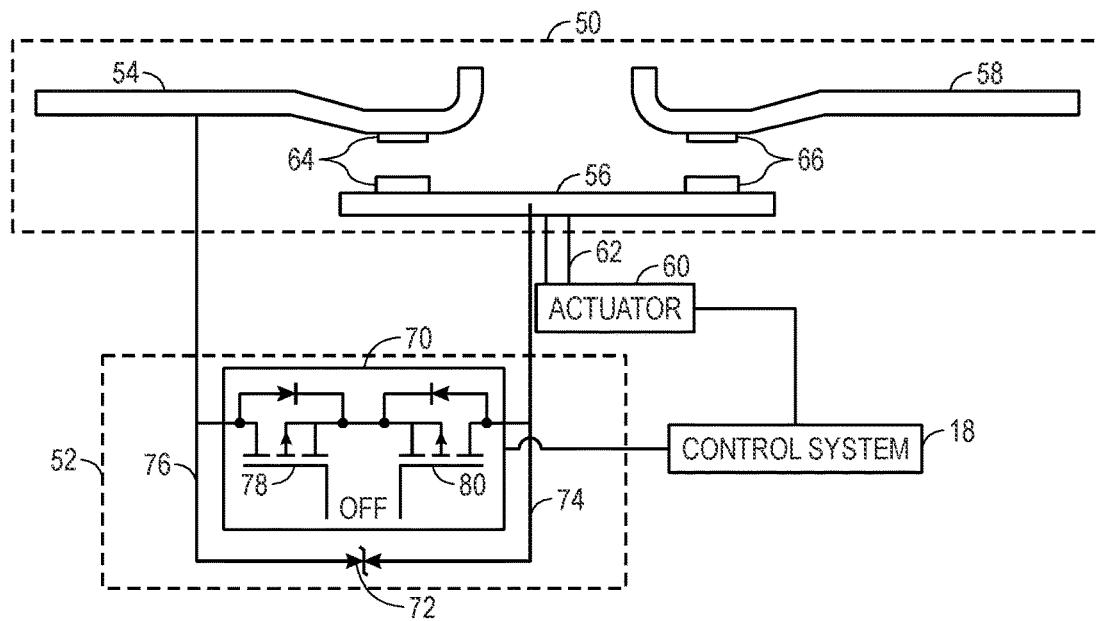
Figure 7:
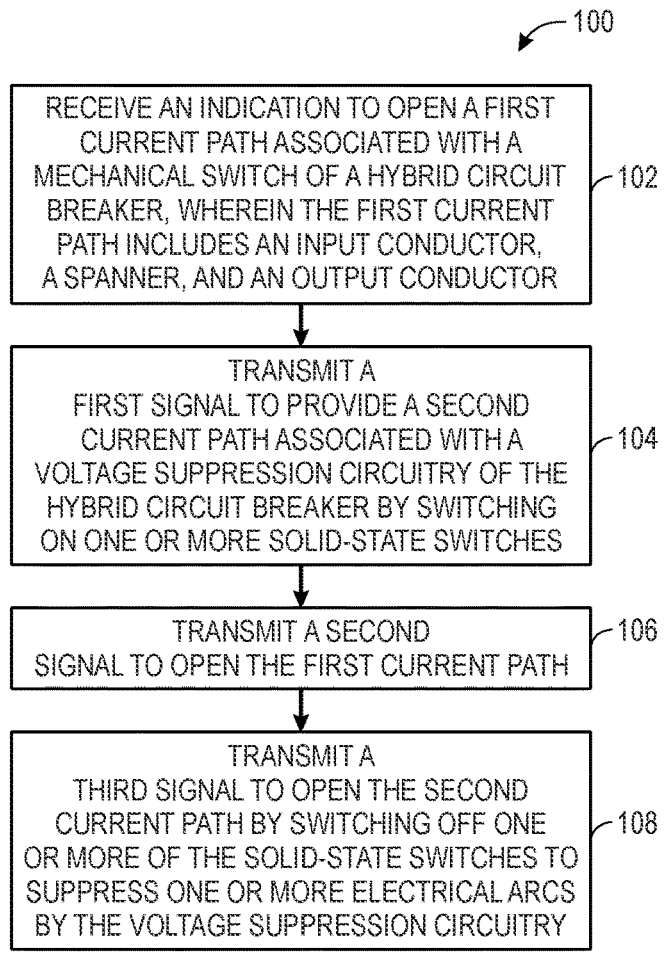
Figure 8:
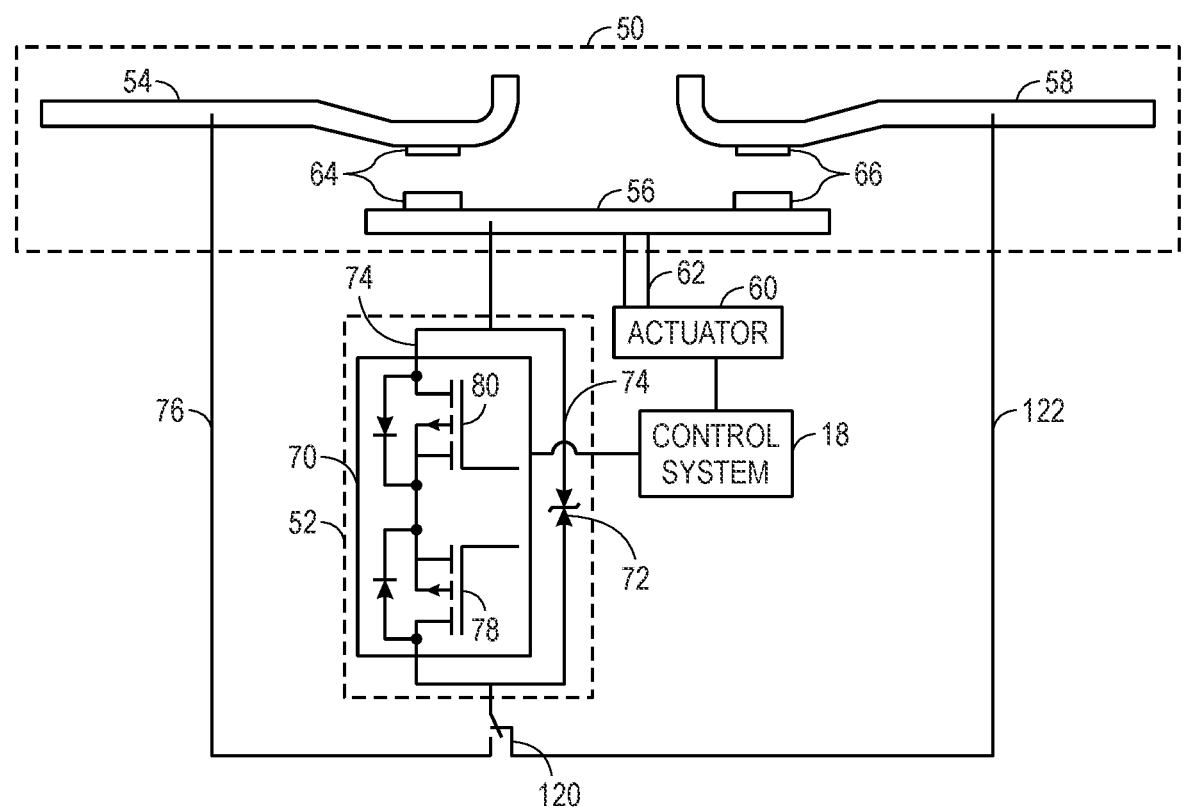

FIG. 3 presents the hybrid circuit breaker of FIG. 2 when providing a second current path of a solid-state switching circuit while the mechanical switch system is conducting electrical current through the conductive path, in accordance with embodiments described herein;

FIG. 4 presents the hybrid circuit breaker of FIG. 3 when opening the first current path of the mechanical switch system creates one or more electrical arcs, in accordance with embodiments described herein;

FIG. 5 presents the hybrid circuit breaker of FIG. 4 when opening the second current path of the solid-state switching circuit to suppress the one or more electrical arcs, in accordance with embodiments described herein;

FIG. 6 presents the hybrid circuit breaker of FIG. 5 after the solid-state switching circuit suppressed the one or more electrical arcs of the hybrid circuit breaker, in accordance with embodiments described herein;

FIG. 7 is a flowchart of a process for operating the hybrid circuit breaker of FIGS. 2-6 to break arc current and suppress at least a portion of electrical power of the one or more electrical arcs, in accordance with embodiments described herein; and FIG. 8 is a an embodiment of the hybrid circuit breaker of the feeder system of FIG. 1 to distribute or balance the wear between the contact pairs of the hybrid circuit breaker, in accordance with embodiments described herein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. As used herein, "in-line" refers to a longitudinal axis of a drive module or a component of a drive module arranged parallel with a rotational axis of a rotor of a motor. As used herein, "potting" refers to covering electronic components (e.g., circuitry) and/or filling an assembly containing electronic components with a solid or gelatinous material to prevent adverse environmental factors (e.g., water, moisture, corrosion, and so forth) and/or adverse effects from physical forces (e.g., impacts, shocks, vibrations, and so forth). As used herein, "power conversion" refers to converting alternating current into direct current, converting direct current into alternating current, altering a voltage of a current, or altering a frequency of a current, or any combination thereof.

The current disclosure is related to a hybrid circuit breaker including a mechanical switch and arc current voltage suppression circuitry. The mechanical switch may include an input conductor, an output conductor, and a spanner (e.g., contactor). The input conductor may couple to and uncouple from the output conductor based on a position of the spanner. The spanner may move to a first position or a second position to couple and uncouple the input conductor and the output conductor, respectively.

When the spanner is in the first position, a first side of the spanner and the input conductor may couple via a first pair of contacts (e.g., a first contact pair) and a second side of the spanner and the output conductor may couple via a second pair of contacts (e.g., a second contact pair). Moreover, the first pair of contacts and the second pair of contacts may uncouple as the spanner moves away from the first position to the second position. In some cases, an actuator, a magnet, or other suitable device connected to the spanner may receive one or more control signals (e.g., from a controller) to cause the spanner to move to the first position or the second position.

In particular, the spanner may move to the first position to provide a first conductive path (e.g., a first current path) between the input conductor and the output conductor. As such, electrical current may flow through the first conductive path of the hybrid circuit breaker when the spanner is at the first position. Moreover, the spanner may move to the second position to open the first conductive path by uncoupling the input conductor and the output conductor. For example, the spanner may provide galvanic isolation by moving to the second position, thereby providing a gap (e.g., an air gap) between the input conductor, the output conductor, and the spanner. Accordingly, moving the spanner to the second position may halt the electrical current flow through the hybrid circuit breaker.

If not compensated for, in some cases, moving the spanner from the first position to the second position may create an electrical arc between the spanner and the input conductor and/or the output conductor when electrical current is flowing through the hybrid circuit breaker. For example, the electrical arc may temporarily short a connection between the first pair of contacts and/or the second pair of contacts as the spanner is moving to the second position. An arc current of the electrical arc may damage and/or degrade the first contact pair, the second contact pair, and/or other elements of the hybrid circuit breaker.

In such cases, the arc current voltage suppression circuitry, hereinafter referred to as the voltage suppression circuitry, may be positioned in such a manner to actively suppress the arc current of the electrical arc to reduce or prevent such damages. For example, the voltage suppression circuitry may provide a second conductive path (e.g., a second current path) between the spanner and the input conductor or the output conductor when the spanner is moving away from the first position. As such, the arc current of the electrical arc may initially flow through the second conductive path. Moreover, the voltage suppression circuitry may open the second conductive path to suppress the arc current upon detecting an electrical arc, as will be appreciated.

The voltage suppression circuitry may reduce or prevent damages of the electrical arc to the first contact pair, the second contact pair, and/or the spanner based on discharging the electrical arc current. Moreover, discharging the electrical arc current may dissipate heat that may otherwise be present based on the electrical arc current. The heat may also reduce a lifespan of the first contact pair, the second contact pair, and/or the spanner and therefore the hybrid circuit breaker. Accordingly, the voltage suppression circuitry may increase a lifespan of the spanner and the hybrid circuit breaker.

By way of introduction, FIG. 1 is a block diagram of a feeder system 10 (e.g., motor feeder system, motor control center (MCC) feeder system), which may be part of an industrial automation system. The feeder system 10 may include a power supply, such as an alternating current (AC) power supply 12, to supply power to loads coupled downstream. The feeder system 10 may also include a hybrid circuit breaker 14 coupled to the AC power supply 12. The AC power supply 12 may supply current and/or voltage to an electrical load 16 coupled to the hybrid circuit breaker 14.

In some cases, when abnormal operation occurs, such as when a current that is uncharacteristically high is delivered to the electrical load 16, the hybrid circuit breaker 14 may electronically disconnect the AC power supply 12 from the electrical load 16. As such, the hybrid circuit breaker 14 may protect the electrical load 16 from supply voltages and/or supply currents that may damage the hybrid circuit breaker 14.

Any suitable number of supply devices may be represented by the AC power supply 12, such as any combination of rectifiers, converters, power banks, generation devices, or the like. It should be understood that the feeder system 10 may include one or more motor-drive systems, motors, MCCs, or the like as the electrical load, coupled between any of the depicted devices and that the feeder system 10 may include one or more additional components not depicted in FIG. 1.

For example, the feeder system 10 may include any suitable type of rectifier device that includes a number of switches controllable by any suitable power converter. For example, the AC power supply 12 may include an active front end (AFE) converter, a diode converter, a thyristor converter, a diode front end rectifier, or the like. In some embodiments, the switches of the AC power supply 12 may be semiconductor-controlled devices, transistor-based (e.g., insulated-gate bipolar transistor (IGBT), metal-oxide semiconductor field-effect transistor (MOSFET), or other suitable transistor) devices, or other suitable devices in which the opening and/or closing of the switch may be controlled using an external signal (e.g., gate signal), which may be provided by the control system 18. The AC power supply 12 may provide AC supply signals (e.g., AC voltage, AC current, a regulated AC output) on a bus 20, which may be provided to the hybrid circuit breaker 14. In some cases, the bus 20 may include three transmission lines for providing each phase of a three-phased electrical power to the electrical load 16 via a dedicated hybrid circuit breaker 14.

It is noted that the feeder system 10 may be used in a variety of industrial automation systems, such as food manufacturing, industrial operations systems, refineries, or the like. In this way, implementation and use of the hybrid circuit breaker 14 to protect various electrical loads may improve operations of industrial automation systems. For example, the hybrid circuit breaker 14 may include a mechanical switch system and voltage suppression circuitry.

The hybrid circuit breaker 14 may use the voltage suppression circuitry to actively extinguish one or more electrical arcs of the mechanical switch system when electronically disconnecting the AC power supply 12 from the electrical load 16. The voltage suppression circuitry may include a solid-state switching circuit and a voltage suppressor to break an arc current and thereby extinguish (e.g., suppress) the electrical arcs. Accordingly, the voltage suppression circuitry may reduce or eliminate an adverse effect of the electrical arcs on the mechanical switch system (or the hybrid circuit breaker 14) and improve (e.g., increase) reliability and lifespans of systems using the hybrid circuit breakers 14.

Industrial automation systems may operate in response to signals generated by the control system 18. The control system 18 may include any suitable number of electronic devices and/or components to generate and/or manage generation of the control signals. For example, the control system 18 may include a communication component 22, a processor 24, a memory 26, storage 28, and input/output (I/O) ports 30, or the like, for generating and managing generation of control signals.

The communication component 22 may be a wireless or wired communication component that facilitates communication between the control system 18, the hybrid circuit breaker 14, or other suitable electronic devices. The processor 24 may be any type of computer processor or microprocessor capable of executing computer-executable code. The memory 26 and the storage 28 may be any suitable articles of manufacture that may serve as media to store processor-executable code, data, or the like. These articles of manufacture may represent computer-readable media (i.e., any suitable form of memory or storage) that may store the processor-executable code used by the processor 24 to perform the presently disclosed techniques, such as to predictively respond to operational changes, or the like.

The I/O ports 30 may couple to one or more sensors, one or more input devices, one or more displays, or the like, to facilitate human or machine interaction with the control system 18, the hybrid circuit breaker 14, or other suitable electronic devices. For example, based on a notification provided to the operator via a display, the operator may use an input device to instruct the adjustment of a parameter associated with the hybrid circuit breaker 14.

Keeping the foregoing in mind, sometimes the control system 18 may communicate with the hybrid circuit breaker 14 using one or more communication techniques. For example, the hybrid circuit breaker 14 may include a controller area network (CAN) communicative coupling and/or an internet protocol (IP)-based communicative coupling, such as an Ethernet IP communicative coupling, to the control system 18. These communicative couplings may enable the hybrid circuit breaker 14 to communicate with the control system 18 without intervention from a host computer. Thus, the hybrid circuit breaker 14 may communicate directly with the control system 18 without using an intervening computing device.

In some cases, the control system 18 may use one or more configuration interfaces to communicate with the hybrid circuit breaker 14. The configuration interface may be a graphical user interface and/or logically-defined data object (e.g., data table) that permits the control system 18 and/or user to provide and/or update a configuration and/or to obtain a status of the hybrid circuit breaker 14. In this way, the configuration interface may be a data boundary used to translate configurations from devices external to the hybrid circuit breaker 14 to a format readable by the hybrid circuit breaker 14 and/or to translate statuses from the hybrid circuit breaker 14 into a format readable by devices external to the hybrid circuit breaker 14.

The control system 18 may also permit configuration of properties of the hybrid circuit breaker 14 based at least in part on thermal measurements and/or metering information, such as phase-phase voltages, phase-to-ground voltages, input current, output current, frequency, power, status of the hybrid circuit breaker 14 (e.g., Open, Close, Blocked, Failure), or the like. In this way, the control system 18 may determine a current operation of the hybrid circuit breaker 14 and use the information of the current operation to determine how to adjust an operation of the hybrid circuit breaker 14. For example, the control system 18 may determine that a failure is present on the hybrid circuit breaker 14 and has a thermal measurement higher than a historical average for the hybrid circuit breaker 14. Using this information, the control system 18 may determine that an undesired operational state is present, and thus may determine to open the hybrid circuit breaker 14. Furthermore, the control system 18 may use this information to operate other devices upstream and/or downstream of the hybrid circuit breaker 14, such as controlling additional protection circuitry to further isolate the hybrid circuit breaker 14 from the industrial automation system.

The properties, in some embodiments, may also be used to define operation limits corresponding to determined settings to be used to protect the load. The operation limits may correspond to operating ranges set by governing agencies or standard committees, such as American National Standards Institute (ANSI®), Underwriters Laboratories (UL®), International Electrotechnical Commission (IEC®) or the like, and may be used to protect the hybrid circuit breaker 14, the electrical load 16, or the like from undesired operating conditions. Furthermore, the properties may also define protection groups or classes associated with the hybrid circuit breaker 14. Protection groups or classes may correspond to groups of electrical loads 16 that may have a same protection scheme. These protection groups or classes may be classifications of types of protection for different devices set by governing agencies or standard committees.

When the electrical load 16 is classified as part of a protection group with another electrical load 16, it may be desired to protect both electrical loads 16 with a hybrid circuit breaker 14 set to the same settings. In this way, when a different electrical load 16 is installed to the hybrid circuit breaker 14, the protection groups or classes may be updated to indicate the new group or class of the new electrical load 16. This may cause the hybrid circuit breaker 14 to automatically update its operational settings to accommodate one or more properties of the new electrical load 16. Use of the protection groups may thus improve deployment of setting changes to the hybrid circuit breakers 14 by making an overall installation process of a new electrical load 16 relatively faster since less time is spent updating operational settings of the hybrid circuit breaker 14.

In some embodiments, the hybrid circuit breaker 14 may detect a protection group or class of its electrical load 16 automatically and/or without receiving the property from the control system 18. In these cases, the hybrid circuit breaker 14 may sense metering information (e.g., operational properties) of the electrical load 16 to determine or identify a protection group or class that applies to the electrical load 16. For example, the hybrid circuit breaker 14 may determine that it outputs single-phase power and that its load is operating at a relatively high voltage that corresponds to an operating voltage of a particular motor load, thus the hybrid circuit breaker 14 may automatically classify its electrical load 16 as a motor class (e.g., certain rated voltage) based on this analysis. For example, a dedicated hybrid circuit breaker 14 may couple to each of the three transmission lines of the bus 20 to open or short a connection of a respective phase of the three-phased power between the AC power supply 12 and the electrical load 16.

Although embodiments of the hybrid circuit breaker 14 are described above with respect to the feeder system 10 including the AC power supply 12, alternatively or additionally, the feeder system 10 may include a Direct Current (DC) power supply with the hybrid circuit breaker 14. Moreover, other viable systems with different circuit components may also incorporate the hybrid circuit breaker 14 to switch ON and OFF to provide or open an electrical current path between respective sources and loads. With the foregoing in mind, FIGS. 2-6 depict the hybrid circuit breaker 14 in accordance with embodiments described herein. For example, FIGS. 2-6 may each illustrate the hybrid circuit breaker 14 at a different step of a process for electronically disconnecting the AC power supply 12 from the electrical load 16. Although the steps associated with each of FIGS. 2-6 are described in a particular order, it should be appreciated that in different embodiments, the hybrid circuit breaker 14 may perform the described steps in any suitable order. Moreover, in different embodiments, the hybrid circuit breaker 14 may bypass one or more of the steps and/or may perform one or more additional steps when electronically disconnecting the AC power supply 12 from the electrical load 16.

Referring first to FIG. 2, the hybrid circuit breaker 14 may include a mechanical switch system 50 and voltage suppression circuitry 52. In some embodiments, the hybrid circuit breaker 14 may include the mechanical switch system 50 and the voltage suppression circuitry 52 disposed in one common housing. The mechanical switch system 50 may include an input conductor 54, a spanner 56, and an output conductor 58. The input conductor 54 may couple to the AC power supply 12 and the output conductor 58 may couple to the electrical load 16. The spanner 56 may move to a first position to couple to the input conductor 54 and the output conductor 58. Moreover, the spanner 56 may move to a second position to uncouple from the input conductor 54 and the output conductor 58. In the depicted embodiment, the spanner 56 is positioned in parallel with a plane in which a first contact pair 64 and a second contact pair 66 (and/or the input conductor 54 and the output conductor 58) are arranged. In alternative cases, the spanner 56 may have different shapes, configuration of contacts, and/or angles for moving to couple to and uncouple from the input conductor 54 and the output conductor 58.

In some embodiments, an actuator 60 may move the spanner 56 to the first position and the second position. The actuator 60 may be coupled to the spanner 56 and may cause the spanner 56 to move toward and away from the input conductor 54 and the output conductor 58 by extending or retracting at least one arm 62, hereinafter the arm 62. In the depicted embodiment, the arm 62 may be coupled to the spanner 56 to form a right angle, but the arm 62 may couple to the spanner 56 at any other viable angle. The arm 62 may thus couple the actuator 60 to the spanner 56. For example, the actuator 60 may extend and retract the arm 62 based on receiving one or more control signals from the control system 18. In some cases, the actuator 60 may include a solenoid causing the spanner 56 to move by extending or retracting the arm 62. However, the actuator 60 may include any additional or different suitable motor that may move the spanner 56 by way of the arm 62.

In FIGS. 2 and 3, the spanner 56 is at the first position. For example, in the depicted embodiments, the actuator 60 may extend the arm 62 vertically (based on the depicted orientation of the hybrid circuit breaker 14), such that the spanner 56 moves to the first position. In alternative or additional cases, the actuator 60 may extend the arm 62 at a different angle (e.g., based on an angle of coupling between the spanner 56 and the arm 62, an angle of coupling between the arm 62 and the actuator 60, etc.). When the spanner 56 is at the first position, the first contact pair 64 of the spanner 56 and the input conductor 54 and the second contact pair 66 of the spanner 56 and the output conductor 58 are mechanically coupled to each other. As such the spanner 56 and the input conductor 54 are electrically coupled to each other via the first contact pair 64. Moreover, the spanner 56 and the output conductor 58 are electrically coupled to each other via the second contact pair 66. Accordingly, the mechanical switch system 50 may provide a first current path 68 (e.g., a first conductive path) between the input conductor 54 and output conductor 58 when the spanner is at the first position.

The voltage suppression circuitry 52 may include a solid-state switching circuit 70 and a voltage suppressor 72 to actively extinguish the one or more electrical arcs. The solid-state switching circuit 70 and the voltage suppressor 72 may be coupled in parallel between a first node 74 and a second node 76 of the voltage suppression circuitry 52. In the depicted embodiments, the first node 74 is coupled to the spanner 56 and the second node 76 is coupled to the input conductor 54. In alternative embodiments, the second node 76 may be coupled to the spanner 56 and the output conductor 58. Moreover, in specific cases, the second node 76 may switch between coupling the spanner 56 to the input conductor 54 and the output conductor 58. Such specific cases are described below with respect to FIG. 8.

In the depicted embodiments, the solid-state switching circuit 70 may include a first solid-state switch 78 and a second solid-state switch 80. The first solid-state switch 78, the second solid-state switch 80, or both may include any suitable solid-state semi-conducting device that may conduct electrical current through semiconductor devices, such as power metal-oxide-semiconductor field-effect transistors (MOSFETs), insulated-gate bipolar transistors (IGBTs), metal-oxide-semiconductor-controlled thyristors (thyristors), vertical metal oxide semiconductors or V-groove MOSs (VMOSs), laterally-diffused metal-oxide semiconductors (LDMOSs), diodes, and the like. It should be appreciated that, in different embodiments, the solid-state switching circuit 70 may include a different number of solid-state switches.

The first solid-state switch 78 and the second solid-state switch 80 may each provide a directional current path between the input conductor 54 and the spanner 56 when in a closed state. For example, the first solid-state switch 78 may conduct electrical current from the second node 76 to the first node 74 when operating in a closed state. As such, when in the closed state (e.g., on state), the first solid-state switch 78 may provide a current path from the input conductor 54 to the spanner 56 via the solid-state switching circuit 70. In the depicted embodiments, a drain of the first solid-state switch 78 may couple to the second node 76 of the voltage suppression circuitry 52. Moreover, a source of the first solid-state switch 78 may couple to a source portion of the second solid-state switch 80 (e.g., or to the first node 74 of the voltage suppression circuitry 52 when the second solid-state switch 80 is in closed state) to provide the current path from the input conductor 54 to the spanner 56.

Moreover, the second solid-state switch 80 may conduct the electrical current from the first node 74 to the second node 76 when operating in the closed state (e.g., on state). As such, when in the closed state, the second solid-state switch 80 may provide a current path from the spanner 56 to the input conductor 54 via the solid-state switching circuit 70. For example, a drain of the second solid-state switch 80 may couple to the first node 74. Moreover, the source of the second solid-state switch 80 may couple to the source portion of the first solid-state switch 78 (e.g., or to the second node 76 when the first solid-state switch 78 is in closed state) to provide the current path from the spanner 56 to the input conductor 54. In some embodiments, the control system 18 may provide the one or more control signals to open or close the first solid-state switch 78, the second solid-state switch 80, or both.

Moreover, the voltage suppressor 72 may include any suitable electronic component that may suppress (e.g., absorb) excess electrical energy present when an overvoltage event is present. In some cases, the control system 18 may provide one or more control signals to switch off the solid-state switching circuit 70 based on determining the excess electrical energy. For example, the voltage suppressor 72 may provide a current path with high impedance between the first node 74 and the second node 76 when a differential voltage across the voltage suppressor 72 is higher than a threshold. In some cases, the voltage suppressor 72 may include a voltage suppression diode, a Zener diode, a metal-oxide varistor (MOV), a Transient Voltage Suppressor (TVS), a snubber circuit (e.g., resistor-capacitor (RC) snubber, resistor-capacitor-diode (RCD) snubber, etc.), and the like.

In FIG. 2, the current paths through the voltage suppression circuitry may be open (e.g., non-conductive) and electrical current may flow through the first current path 68 of the mechanical switch system 50. For example, the first solid-state switch 78, the second solid-state switch 80, or both may be in an open state (e.g., off state). Moreover, the current path through the voltage suppressor 72 is electronically open based on the differential voltage across the voltage suppressor 72 being lower than a threshold. Accordingly, based on the spanner 56 being at the first position, electrical current may flow through the first current path 68 of the mechanical switch system 50. For example, the AC power supply 12 may provide electrical power to the electrical load 16 based on the electrical current flow through the first current path 68 of the hybrid circuit breaker 14.

In FIG. 3, the solid-state switching circuit 70 may provide a second current path 82 (e.g., a second conductive path) between the first node 74 and the second node 76. For example, the control system 18 may provide one or more control signals to switch on the first solid-state switch 78 and the second solid-state switch 80 to provide the second current path 82. In the depicted embodiment, the solid-state switching circuit 70 may provide the second current path 82 between the spanner 56 and the input conductor 54 while the spanner 56 is at the first position. As such, current conducting between the input conductor 54 and the output conductor 58 may have two paths to traverse (e.g., first current path 68 and second current path 82).

In FIG. 4, the spanner 56 is at the second position or is moving away from the first position toward the second position. For example, the actuator 60 may retract the arm 62 (e.g., vertically) such that the spanner 56 moves away from the first position toward the second position. As the spanner 56 moves (e.g., vertically moves) away from the first position, the first contact pair 64 and the second contact pair 66 may electronically uncouple and thereby open the first current path 68 between the input conductor 54 and the output conductor 58.

In some cases, moving the spanner 56 from the first position toward the second position may create one or more electrical arcs. For example, one or more electrical arcs may be present between the first pair of contacts 64 and/or the second pair of contacts 66 as the spanner 56 moves away from the first position. In such cases, the second current path 82 may reduce a differential voltage across the first contact pair 64 to reduce a likelihood of creating one or more electrical arcs 84 between the first pair of contacts 64. That is, after the first current path 68 is opened, the available current across the first pair of contacts 64 may be directed to the second current path 82. However, in some embodiments, the one or more electrical arcs 84 may be created between the second pair of contacts 66 as the spanner 56 moves from the first position to the second position.

With this in mind, in FIG. 5, the solid-state switching circuit 70 may open the second current path 82 (shown in FIG. 4) to interrupt the one or more electrical arcs 84 that may be present on the second current path 82. For example, the control system 18 may provide one or more control signals to the solid-state switching circuit 70 to cause the first solid-state switch 78 and the second solid-state switch 80, or both of the solid-state switching system 70 to turn off (e.g., open). As a result, the second current path 82 may open to actively break any and extinguish any present one or more electrical arcs 84. That is, the voltage suppressor 72 may suppress (e.g., absorb) at least a portion of electrical power of the one or more electrical arcs 84 upon opening the second current path 82.

As mentioned above, the voltage suppressor 72 may be coupled parallel to the solid-state switching circuit 70. Upon receiving a voltage spike higher than a threshold (e.g., 0.1 volt (V), 0.7 V, 1.5 V, and so on) (or in some cases a current surge higher than a threshold) the voltage suppressor 72 may provide a third current path 86 (e.g., a third conductive path) with high impedance to suppress (e.g., absorb) at least a portion of the electrical power of the one or more electrical arcs 84. For example, the solid-state switching circuit 70 may divert available electrical power of the one or more electrical arcs 84 to the voltage suppressor 72 by opening the second current path 82. The voltage suppressor 72 may suppress the electrical power as described above. Accordingly, the voltage suppressor 72 may provide the third current path 86 with high impedance between the first node 74 and the second node 76 to suppress the available electrical power on the voltage suppression circuitry 52.

In some embodiments, the control system 18 may provide the one or more control signals to open the second current path 82 in response to detecting the presence of the one or more electrical arcs 84, in response to electronically uncoupling the first contact pair 64 and the second contact pair 66, based on a time duration after providing the second current path 82 (e.g., a fixed time sequence), among other possibilities. For example, the hybrid circuit breaker 14 may include one or more current and/or voltage sensors to provide indication associated with the presence of the one or more electrical arcs 84. In some embodiments, the solid-state switching circuit 70 may include electrical arc detection circuitry (e.g., over-current detection circuitry, over-voltage detection circuitry, among other circuitry) to provide the second one or more control signals to open the second current path 82 in response to detecting the presence of the one or more electrical arcs 84.

In any case, FIG. 6 depicts the hybrid circuit breaker 14 after the one or more electrical arcs 84 are suppressed. In the depicted embodiment, the first current path 68, the second current path 82, and the third current path 86 are open. Accordingly, the hybrid circuit breaker 14 may provide galvanic isolation between the input conductor 54, the spanner 56, and the output conductor 58 by providing the gap (e.g., air gap) between the first pair of contacts 64 and the second pair of contacts 66. Moreover, the hybrid circuit breaker 14 may reduce damages to the spanner 56, the first pair of contacts 64, and/or the second pair of contacts 66, among other components based on operations of the voltage suppression circuitry 52.

FIG. 7 is a process 100 performed by the processor 24 to operate the hybrid circuit breaker 14 of FIGS. 2-6 in accordance with embodiments described herein. At the beginning of the process 100, the mechanical switch system 50 may be initially closed. Moreover, the first solid-state switch 78, the second solid-state switch 80, or both of the solid-state switching system 70 are off (e.g., open). As such, electrical current may be present on the first current path 68 of the hybrid circuit breaker 14.

At block 102, the processor 24 may receive an indication to open the first current path 68 of the hybrid circuit breaker 14. For example, the processor 24 may receive one or more control signals from a control system, a monitoring system, or some other supervising device that detects a presence of a fault, an undesirable condition (e.g., overvoltage, overcurrent), or the like. By way of example, the undesirable condition may correspond to a current flow within the hybrid circuit breaker 14 being above a threshold. In some embodiments, one or more sensors (e.g., current sensor, voltage sensor, current transformer, Rogowski coil, among other things) of the hybrid circuit breaker 14 may provide a measurement that is associated with the current flow of the hybrid circuit breaker 14.

Based on receiving the indication or request to open the mechanical switch system 50, at block 104, the processor 24 may transmit a first signal (or multiple signals) to the first solid-state switch 78, the second solid-state switch 80, or both, to cause the first solid-state switch 78, the second solid-state switch 80, or both to switch on and provide the second current path 82. In some cases, some electrical current may flow through the solid-state switching circuit 70 in response to the providing the second current path 82. However, in other cases, the electrical current may flow (e.g., substantially flow) through the first current path 68.

In any case, at block 106, the processor 24 may transmit a second signal (or multiple signals) to the actuator 60 to cause the actuator 60 (or a solenoid) to open the mechanical switch system 50 of the hybrid circuit breaker 14. For example, the processor 24 may transmit the second signal to cause the arm 62 to retract via the actuator 60. The actuator 60 may then retract the arm 62 in response to receiving the second signal. In alternative or additional cases, one or more sensors of the hybrid circuit breaker 14 may provide the first signal and the second signal directly to the solid-state switching circuit 70 and the actuator 62, respectively, to extend or retract the arm 62. For example, such sensors may provide the first signal and the second signal based on detecting a current and/or voltage of the hybrid circuit breaker 14 being higher than a threshold (e.g., a predetermined threshold, above zero, nonzero).

At block 108, the processor 24 may transmit a third signal (or multiple signals) to switch off the first solid-state switch 78, the second solid-state switch 80, or both to suppress one or more electrical arcs (e.g., the electrical arc 84). In some embodiments, the processor 24 may transmit the third signal to the first solid-state switch 78 and/or the second solid-state switch 80 based on detecting the one or more electrical arcs when retracting the spanner 56. For example, the processor 24 may transmit the third signal based on determining that a differential voltage across the solid-state switching circuit 70 is higher than a threshold. In some cases, one or more sensors of the hybrid circuit breaker 14 may provide an indication of the differential voltage across the solid-state switching circuit 70 to the processor 24.

Moreover, the processor 24 may provide the third signal to the first solid-state switch 78 and/or the second solid-state switch 80 based on a direction of the current to cause the first solid-state switch 78 and/or the second solid-state switch 80 to open. For example, the processor 24 may provide the third signal to open the first solid-state switch 78 when the current is flowing from the input conductor 68 to the spanner 56. Moreover, the processor 24 may provide the second signal to open the second solid-state switch 80 when the current is flowing from the spanner 56 to the input conductor 68.

In any case, the hybrid circuit breaker 14 may suppress electrical power of the electrical arcs (e.g., the electrical arc 84) by the voltage suppressor 72 when switching off the first solid-state switch 78 and/or the second solid-state switch 80. As such, a lifespan of the hybrid circuit breaker 14 may increase by reducing damages that may be caused by the electrical arcs. Although process blocks of FIG. 7 are described in particular order, it should be appreciated that the processes may be performed at any other viable order. Moreover, it should be appreciated that in different embodiments, the processor 24 may use different process blocks. For example, the processor 24 may use additional process blocks or withdraw one or more of the process blocks discussed herein.

With the foregoing in mind, in some embodiments, the arc current of the electrical arc 84 may cause the second contact pair 66 to wear over time (e.g., based on a number of operations of the actuator 60). To distribute or balance the wear between the second contact pair 66 and the first contact pair 64, in some embodiments, a switch may electrically connect between the conductor 54 and the conductor 58 after each operation of the hybrid circuit breaker 14. For instance, FIG. 8 illustrate an embodiment of the hybrid circuit breaker 14 including a switch 120. The switch 120 may couple the voltage suppression circuitry 52 to the second node 76 at a first position and to a third node 122 at a second position. The third node 122 is coupled to the switch 120 and the output conductor 58.

In some cases, the control system 18 may provide one or more control signals to change a position of the switch 120. As such, the control system 18 may selectively couple the solid-state switching circuitry 70 and the voltage suppression circuitry 72 to the input conductor 54 and the output conductor 58. In some cases, the control system 18 may provide the one or more control signals to alternatively change the position of the switch 120 between each operation of the actuator 60 moving the spanner 56. Accordingly, the switch 120 may distribute or balance the wear caused by electric arcs (e.g., the electric arc 84) between the second contact pair 66 and the first contact pair 64. Alternatively or additionally, the control system 18 may provide the one or more control signals to alternatively change the position of the switch 120 based on a time period and/or a different frequency of operations of the actuator 60 moving the spanner 56.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A circuit breaker, comprising:
 a first conductor configured to move between a first position and a second position, wherein the first position corresponds to a second conductor being coupled to a third conductor via the first conductor, and wherein the second position corresponds to the second conductor being uncoupled from the third conductor via the first conductor;
 voltage suppression circuitry coupled to the first conductor and at least one of the second conductor and the third conductor, wherein the voltage suppression circuitry comprises solid-state switching circuitry and a voltage suppressor, wherein the voltage suppressor is coupled in parallel to the solid-state switching circuitry, wherein the solid-state switching circuitry is configured to receive an arc current as the first conductor moves from the first position to the second position, and turn off after the first conductor begins to move from the first position, and wherein the voltage suppression circuitry is configured to suppress the arc current; and
 a switch configured to selectively couple the solid-state switching circuitry and the voltage suppressor to the second conductor or the third conductor.

2. The circuit breaker of claim 1, wherein the solid-state switching circuitry comprises a plurality of power metal-oxide-semiconductor field-effect transistors, insulated-gate bipolar transistors, metal-oxide-semiconductor-controlled thyristors, vertical metal oxide semiconductors or V-groove MOSs, laterally-diffused metal-oxide semiconductors, diodes, or a combination thereof.

3. The circuit breaker of claim 1, wherein the voltage suppressor comprises one or more voltage suppression diodes, one or more Zener diodes, one or more metal-oxide varistors, one or more transient voltage suppressors, a snubber circuit, or a combination thereof.

4. The circuit breaker of claim 1, wherein the voltage suppressor is configured to suppress the arc current in response to the solid-state switching circuitry turning off.

5. The circuit breaker of claim 1, comprising a control system configured to send one or more signals to the solid-state switching circuitry to turn off in response to:
 a fixed time sequence;
 receiving data associated with the arc current, a voltage associated with circuit breaker, or both; or
 both.

6. The circuit breaker of claim 1, comprising an actuator configured to move the first conductor between the first position and the second position.

7. The circuit breaker of claim 6, wherein the switch is configured to alternate positions between each operation of the actuator.

8. A method, comprising:
 receiving, by a processor, an indication to open a first conductive path of a circuit breaker, wherein the first conductive path comprises a first conductor, a second conductor, and a spanner;
 transmitting, by the processor, a first signal to a switch configured to selectively couple one or more solid-state switches and a voltage suppressor to the spanner and to the first conductor or the second conductor, wherein the voltage suppressor is coupled in parallel to the one or more solid-state switches;
 transmitting, by the processor, a second signal to an actuator configured to move the spanner from a first position to a second position, wherein the first conductive path is open after the spanner is located in the second position; and
 transmitting, by the processor, one or more third signals to turn off the one or more solid-state switches coupled to a second conductive path of the circuit breaker in response to receiving an indication of arc current present on the second conductive path after the spanner begins to move from the first position, wherein the second conductive path comprises the one or more solid-state switches, the spanner, and the first conductor or the second conductor, and wherein the voltage suppressor receives at least a portion of the arc current in response to the one or more third signals being transmitted.

9. The method of claim 8, comprising:
 receiving, by the processor, an amount of stored energy present on the second conductive path; and
 transmitting, by the processor, the one or more third signals after transmitting the second signal based on determining that the stored energy is above a threshold to share the stored energy between the one or more solid-state switches and the voltage suppressor.

10. The method of claim 8, wherein transmitting, by the processor, the second signal comprises transmitting the second signal to an actuator or solenoid configured to move the spanner away from the first conductor and the second conductor in response to receiving the second signal.

11. The method of claim 8, wherein the indication of the arc current through the second conductive path corresponds to a differential voltage across the one or more solid-state switches being higher than a threshold, a current measurement acquired by a current measurement device, or both.

12. The method of claim 8, wherein the voltage suppressor is configured to absorb at least a portion of an electrical power of the arc current through the second conductive path after the one or more solid-state switches receive the one or more third signals.

13. A tangible, non-transitory, machine-readable medium, comprising machine-readable instructions that, when executed by a processor, cause the processor to perform actions comprising:
receiving an indication to open a first conductive path of a circuit breaker, wherein the first conductive path comprises a first conductor, a second conductor, and a spanner;
transmitting a first signal to a switch configured to selectively couple one or more solid-state switches and a voltage suppressor to the spanner and to the first conductor or the second conductor, wherein the voltage suppressor is coupled in parallel to the one or more solid-state switches;
transmitting a second signal to an actuator configured to move the spanner from a first position to a second position, wherein the first conductive path is open after the spanner is located in the second position; and
transmitting one or more third signals to turn off the one or more solid-state switches coupled to a second conductive path of the circuit breaker in response to receiving an indication of arc current present on the second conductive path, wherein the second conductive path comprises the one or more solid-state switches, the spanner, and the first conductor or the second conductor based on the first signal, and wherein the voltage suppressor receives at least a portion of the arc current in response to the one or more third signals being transmitted.

14. The tangible, non-transitory, machine-readable medium of claim 13, wherein the machine-readable instructions that causes the processor to transmit the second signal to an actuator or solenoid configured to move the spanner away from the first conductor and the second conductor in response to receiving the second signal.

15. The tangible, non-transitory, machine-readable medium of claim 13, wherein the machine-readable instructions that causes the processor to transmit the one or more third signals to switch off at least one of the one or more solid-state switches.

16. The tangible, non-transitory, machine-readable medium of claim 13, wherein the machine-readable instructions that causes the processor to receive the indication of the arc current through the second conductive path corresponds to a differential voltage across the one or more solid-state switches being higher than a threshold, a current measurement acquired by a current measurement device, or both.

17. The tangible, non-transitory, machine-readable medium of claim 13, wherein the machine-readable instructions that causes the processor to cause the voltage suppressor to absorb at least a portion of an electrical power of the arc current through the second conductive path after the one or more solid-state switches receive the one or more third signals.

* * * * *